United States Patent
Yamada et al.

[19]

[11] Patent Number: 6,052,161
[45] Date of Patent: Apr. 18, 2000

[54] LIQUID CRYSTAL DISPLAY APPARATUS

[75] Inventors: Nobuaki Yamada, Osaka; Yasuhiro Kume, Nara; Toshikazu Hirata, Nara; Masahiko Kondo, Nara; Masato Imai; Kazuyuki Endo, both of Gifu, all of Japan

[73] Assignees: Sony Corporation, Tokyo; Sharp Kabushiki Kaisha, Osaka, both of Japan

[21] Appl. No.: 09/165,113

[22] Filed: Oct. 2, 1998

[30] Foreign Application Priority Data

Oct. 3, 1997 [JP] Japan ..................................... 9-287901

[51] Int. Cl.$^7$ ........................................................ G02F 1/133
[52] U.S. Cl. ............................ 349/32; 349/156; 349/145
[58] Field of Search .................................... 349/156, 145, 349/32, 143

[56] References Cited

U.S. PATENT DOCUMENTS 5,535,028  7/1996  Bae et al. .................................. 349/145
5,771,084  6/1998  Fujimori et al. ......................... 349/156
5,844,639  12/1998  Togawa ..................................... 349/32

*Primary Examiner*—James A. Dudek
*Attorney, Agent, or Firm*—Hill & Simpson

[57] ABSTRACT

A plasma address liquid crystal display device having a flat panel structure which is composed of display cells and plasma cells bonded to one another with an intermediate sheet, and in which position registration tolerance between the display and plasma cells can be made less strict. A plasma cell 2 has discharge channels 5 extending in the row direction. The display cell 1 has a electro-optical device 9 and signal electrodes 10 extending along the column direction. Pixels 11 are defined at the points of intersections of the signal electrodes 10 and the discharge channels 5. The electro-optical device 9 is a set of finely partitioned liquid crystal areas 15 and is controlled in orientation to axis-symmetrical orientation. The liquid crystal areas 15 are continuously arrayed at a constant pitch DP finer than an arraying pitch CP of the pixels 11 at least in the column direction. This structure can be extensively applied to the active matrix type liquid crystal display device.

5 Claims, 13 Drawing Sheets

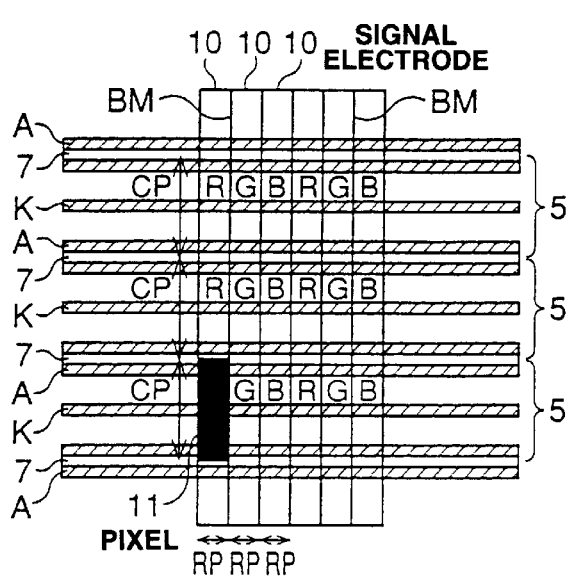
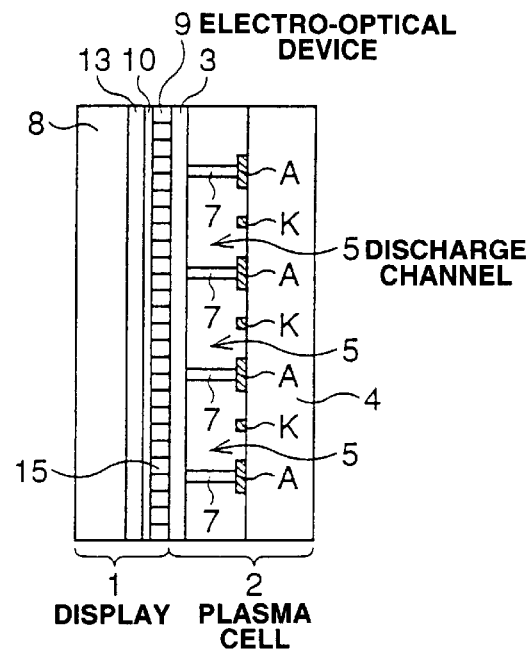
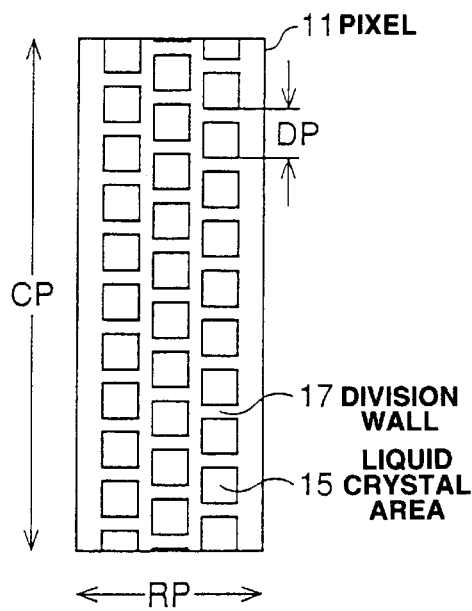
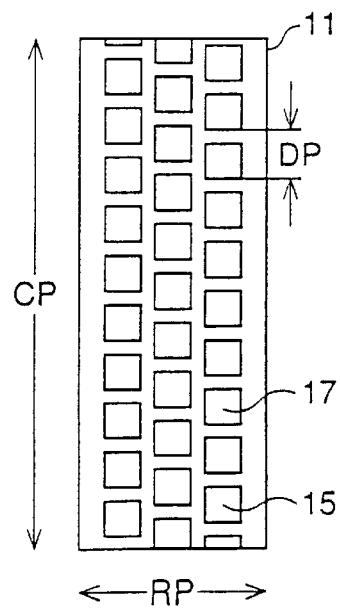
FIG.1A  FIG.1B  FIG.1C  FIG.1D

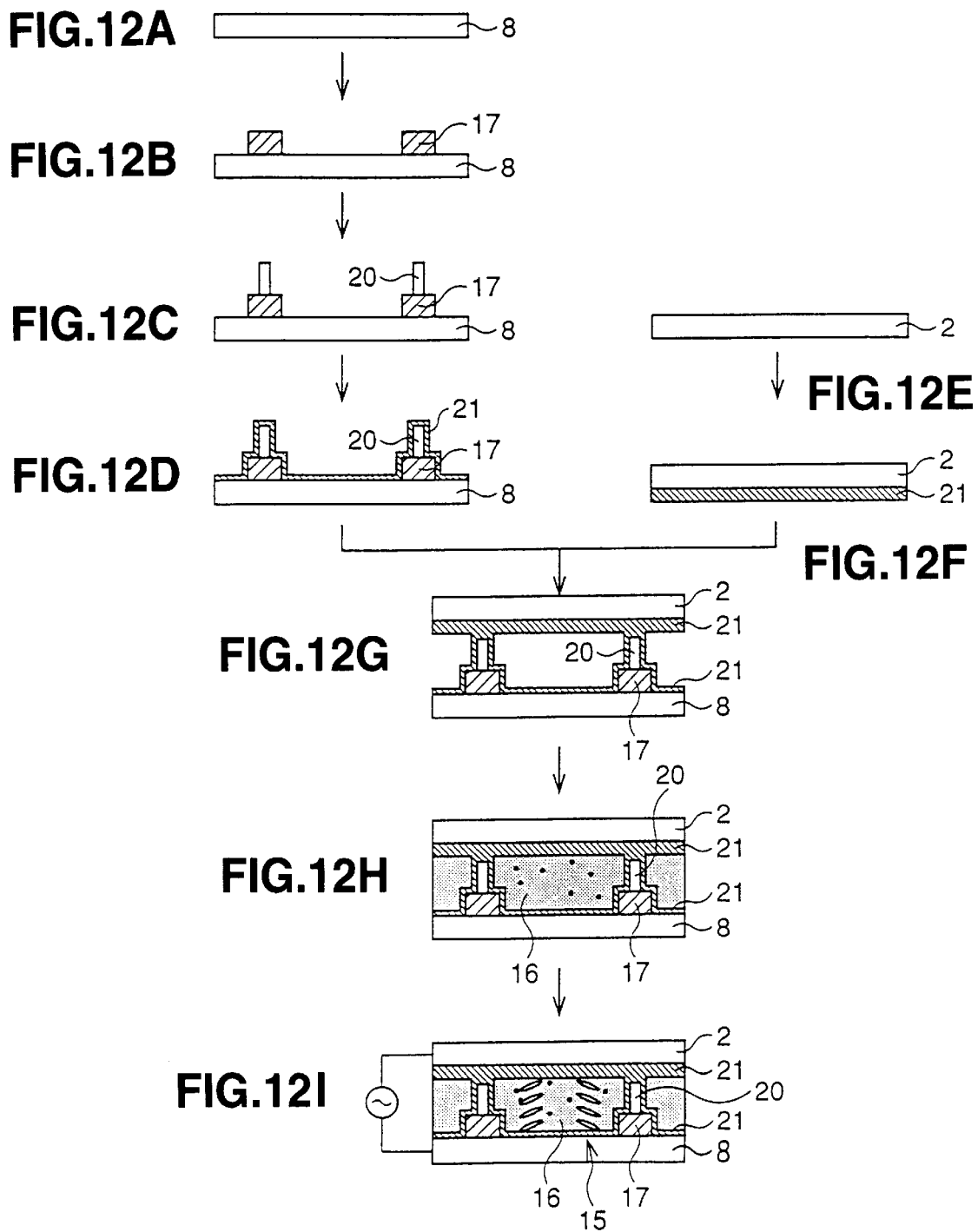

LIQUID CRYSTAL DISPLAY APPARATUS

BACKGROUND OF THE INVENTION

1. Field of the Invention

This invention relates to an active matrix type liquid display apparatus, for example, a plasma address liquid crystal display apparatus having a flat panel structure comprised of a display cell and a plasma cell superposed together. More particularly, it relates to a technique of improving the view angle dependency of the display cell having the liquid crystal as a electro-optical device and further to a technique of moderating the registration tolerance between the display cell and the plasma cell.

2. Description of the Related Art

Among active matrix system liquid crystal display devices (LCDs), there is known a TFTLCD employing a thin-film transistor (TFT) as a pixel driving switching device and a plasma address liquid display (PALC) employing a plasma device. The active matrix system liquid crystal display devices are widely used for a personal computer or a portable monitor for navigation in order to save space and power consumption. In particular, development of the plasma address liquid display is under way as a large-sized display of a flat-panel structure to take the place of the CRT, as disclosed for example in Japanese Laying-Open Patent H-1-217396 or in Japanese Laying-Open Patent H-4-265931. The plasma address liquid display has a flat-panel structure comprised of a display cell and a plasma cell interconnected via an intermediate sheet in-between. The plasma cell is used for addressing the display cell. In the display cell, liquid crystal is prevalently used as a electro-optical device. The plasma cell has plural discharge channels extending in the column direction. The display cell has a electro-optical device such as a liquid crystal and plural signal electrodes in the column direction. A pixel matrix is defined at each point of intersection between the rows of the discharge channel and columns of the signal electrodes.

Conventionally, a display cell routinely uses the TN mode which uses a nematic liquid crystal in a twist orientation as a electro-optical device. However, the TN mode exhibits significant viewing angle dependency, such that the contrast or luminance is varied depending on the angle with which the screen is viewed (viewing angle) to render the display cell difficult to use as a large-sized display. A powerful technique for improving the viewing angle dependency of the display cell employing the liquid crystal is disclosed in Japanese Laying-Open Patent H-6-301015 or in Japanese Laying-Open Patent H-7-120728. The electro-optical device used in this display cell is a set of finely partitioned liquid crystal areas, each of which has orientation controlled with axial symmetry. This axial symmetry helps improve viewing angle dependency by axial symmetry of the liquid crystal orientation significantly.

A liquid crystal display device, which combines a display panel exploiting the axial symmetry orientation technique for a liquid crystal with a plasma cell, has already been developed, as disclosed in Japanese Laying-Open Patent H-9-197384. With this system, a liquid crystal area (liquid crystal domain) having orientation controlled axis-symmetrically is formed in association with a physical pixel positioned at a point of intersection of a row of discharge channels and a column of signal electrodes. This liquid crystal domain represents an optical pixel. An area formed by superposition of the physical pixel on the plasma cell side and the optical pixel on the display cell side represents an effective aperture of the pixel. For assuring an aperture area matched to a design value, it is necessary to realize correct registration between the physical pixel and the optical pixel. However, with increasingly high pixel density of a large-sized display and increasingly high definition, correct registration is becoming more and more difficult. On the other hand, there is a certain gap between the physical pixel and the optical pixel. The result is that, if a screen is viewed from an oblique direction, there is produced parallax between the physical pixel and the optical pixel. Due to this parallax, if the screen is viewed from an oblique direction, the physical and optical pixels are not overlapped in the worst case thus occasionally closing the effective aperture.

SUMMARY OF THE INVENTION

It is therefore an object of the present invention to provide a liquid crystal display device which is free from the above-mentioned drawbacks.

The present invention provides a liquid crystal display apparatus including a matrix array of pixels of a predetermined pitch and switching elements driving the respective pixels, in which a electro-optical device is driven from pixel to pixel to make a display of an active matrix type display. The electro-optical device is a set of finely partitioned liquid crystal areas, at least part of which is controlled in orientation axis-symmetrically. The liquid crystal areas are continuously arrayed at a pitch finer than the arraying pitch of the pixels.

The liquid crystal display apparatus preferably has a flat panel structure including a display cell and a plasma cell bonded to each other with an intermediate sheet in-between. The plasma cell has a plurality of discharge channels extending along the row direction. The display cell has the electro-optical device and a plurality of signal electrodes extending along the column direction. The matrix of the pixels is defined at points of intersection of the signal electrodes with said discharge channels.

The electro-optical device is a set of finely partitioned liquid crystal areas, at least part of which is controlled in orientation to axis-symmetrical orientation. The liquid crystal areas are continuously arrayed at a pitch finer than the arraying pitch of pixels in at least the column direction.

Specifically, the discharge channels include discharge electrodes of alternately opposite polarities extending parallel to one another, and a physical aperture for a pixel is defined between neighboring discharge electrodes of opposite polarities. Each liquid crystal area is an optical aperture for a pixel and the arraying pitch of the liquid crystal areas is set so as to be fine enough to provide a substantially constant light transmission volume of the pixel without regard to the relative position between the physical aperture and the optical apertures in the column direction.

Each liquid crystal area is preferably a liquid crystal domain finely partitioned by lattice- or mesh-shaped partitions and part of the liquid crystal domains are controlled in orientation axis-symmetrically by the wall surface effect proper to said partitions. Each liquid crystal area is of a small size and a plurality of the liquid crystal areas are arrayed in a pixel of a large size in a lattice- or mesh-pattern.

With the liquid crystal display apparatus according to the present invention, the physical aperture is substantially prescribed by the discharge channel of the plasma cell, while the optical aperture is prescribed by the liquid crystal areas of the display cell. Conventionally, a sole physical aperture is associated with a sole optical aperture. In the present invention, plural optical apertures are associated with a sole physical aperture by using an arraying pitch of the optical apertures finer than the arraying pitch of the physical apertures. Since plural optical apertures are arrayed in succession at a finer pitch there is no necessity of position registration with respect to the physical aperture. Since the optical apertures are overlapped in a lattice- or mesh-pattern, there is no risk of interruption of the obliquely transmitted light due to parallax between the two as is met in the conventional system. If the screen is observed from the oblique direction, the light transmitted through the physical aperture is necessarily radiated via the optical apertures arrayed in the lattice pattern.

In the above-described plasma address liquid crystal display device having the flat panel structure of the display cell and the plasma cell bonded to each other via an intermediate sheet in-between, the electro-optical device of the display cell is a set of finely partitioned liquid crystal areas, while the individual liquid crystal areas are controlled to axis-symmetrical orientation. This arrangement significantly improves the viewing angle dependency of the plasma address liquid crystal display device. The liquid crystal areas are arranged continuously at a constant pitch finer than the arraying pitch of pixels. This moderates the position registration tolerance between the plasma cell and the display cell. Moreover, pixel aperture ratio can be prevented from being lowered due to parallax between the overlapped display cell and plasma cell. The present invention can be applied not only to the above-described PALC but also to the active matrix type liquid crystal display apparatus, such as TFTLCD, thus assuring an "alignment-free" effect.

BRIEF DESCRIPTION OF THE DRAWINGS

FIGS. 1a to 1d are plan and cross-sectional views showing the basic structure of a plasma address liquid crystal display device according to the present invention.

FIGS. 12a to 12i illustrate a manufacturing method of the display cell shown in FIG. 11, step by step.

DESCRIPTION OF THE PREFERRED EMBODIMENTS

Figure 2:
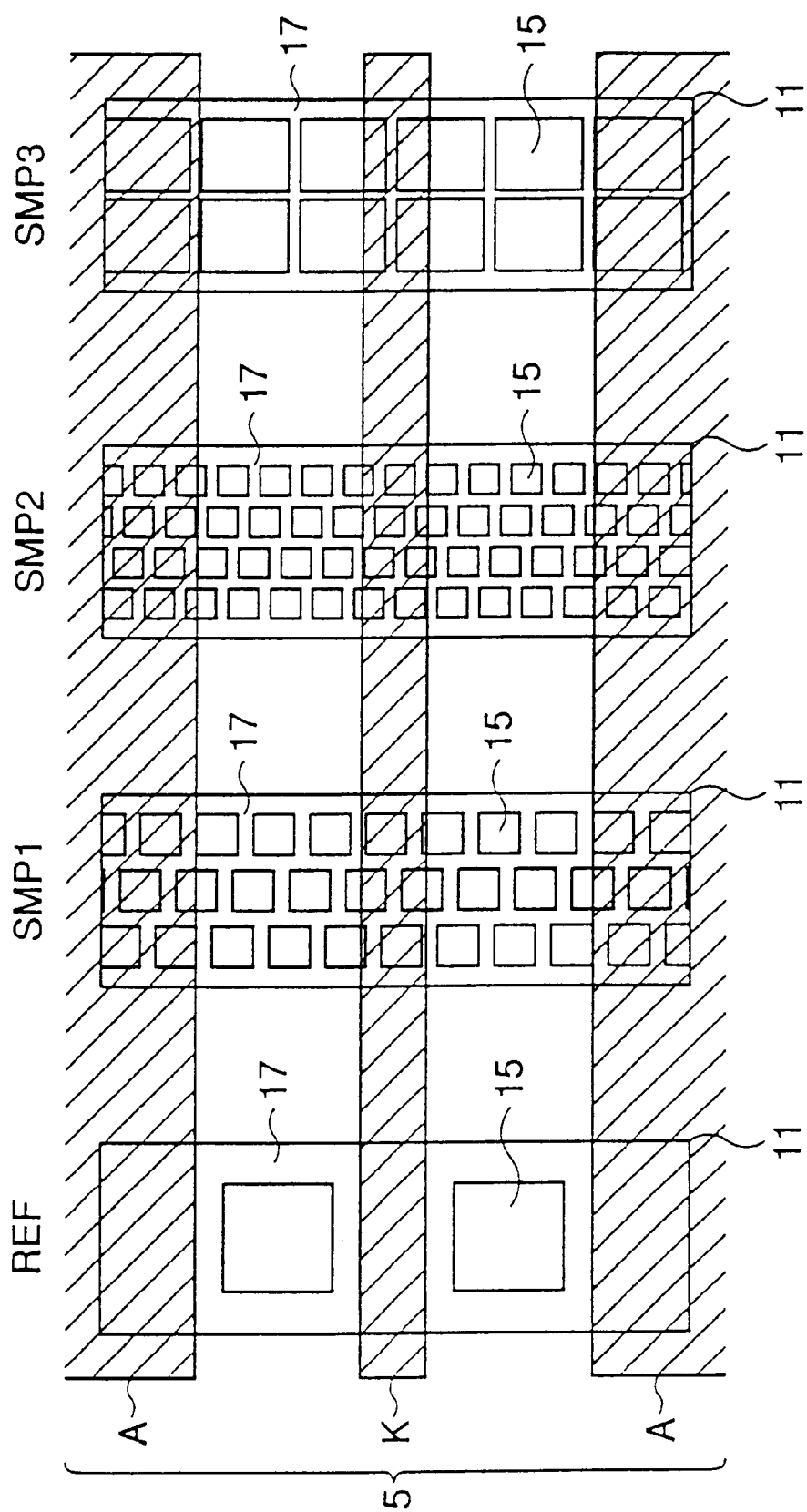
FIG. 2 is a schematic plan view showing a pixel equivalent of the plasma address liquid crystal display device.

Referring to the drawings, preferred embodiments of the present invention will be explained in detail.

FIG. 1 shows the structure of a liquid crystal display device according to the present invention, where FIG. 1a is a plan view and FIG. 1b is a cross-sectional view of the liquid crystal display device and FIGS. 1c and 1d are schematic plan views of a pixel equivalent portion thereof The present liquid crystal display device is of the plasma addressing type and has a flat panel structure including a display cell 1 for modulating the incident light into the outgoing light responsive to picture signals to effect picture display and a plasma cell 2 connected to the display cell 1 by surface connection to effect scanning (addressing) thereof, as shown in FIG. 1b. The plasma cell 2 has display channels 5 in a matrix configuration and sequentially generates plasma discharge to scan the display cell 1 line-sequentially. Each discharge channel 5 has a pair of partitions 7 delimiting a row area, an anode electrode A arranged below the partition and a cathode electrode K arranged between neighboring anode electrodes A. The anode electrode A and the cathode electrode K are of opposite polarities and delimit a physical aperture in-between. That is, light is transmitted only through this physical aperture. On the other hand, the display cell 1 has signal electrodes 10 in a column configuration and has pixels in the points of intersection between the signal electrodes 10 and the discharge channels 5. Picture signals are applied in synchronism with the line-sequential scanning to modulate the incident light from pixel to pixel. The display cell 1 and the plasma cell 2 are separated from each other by an intermediate sheet 3. The plasma cell 2 is constituted by a glass substrate 8 bonded to the intermediate sheet 3 from below, while the display cell 1 is constituted by the glass substrate 8 bonded to the intermediate sheet from above. Between the substrate 8 and the intermediate sheet 3, there is held liquid crystal as a electro-optical device 9. The electro-optical device 9 is a set of finely partitioned liquid crystal areas 15. The liquid crystal areas 15 are controlled in orientation axis-symmetrically. The axis-symmetrical orientation means the state in which liquid crystal molecules are oriented in e.g., a helical configuration. Included in the category of the axis-symmetrical orientation is the concentric or radial liquid crystal molecular orientation. In general, the liquid crystal areas are held between a pair of substrates, with the axis of the axis-symmetrical orientation coinciding with the normal line of the substrate. There are variegated modes of axis symmetry. For example, the liquid crystal areas are oriented concentrically on the upper side substrate, while being oriented radially on the lower side substrate and oriented with twist in an intermediate portion. Alternatively, the intermediate layer may be oriented concentrically, and oriented with a twist towards upper and lower substrates. The axis-symmetrical orientation of the liquid crystal areas can improve viewing angle dependency significantly. Since the retardation of the liquid crystal molecules is compensated in the liquid crystal areas, the transmission ratio of light rays from each viewing angle direction undergoes averaging to lower the viewing angle dependency. On the inner surface of the substrate 8 is formed a color filter 13 to allocate three colors R, G and B to each pixel. The present invention, however, is not limited to the color display and may also be applied to monochromatic display.

Referring to FIG. 1a, plural signal electrodes 10 extending in the column direction intersect plural discharge channels 5 in a plan configuration and a pixel is formed between the two. In FIG. 1a, the pixel is shown with black color to facilitate understanding. Each pixel 11 is rectangular in profile and three colors of R, G and B are allocated thereto by the color filter 13. Three neighboring pixels 11 along the column direction make up a substantially RGB trio. The longitudinal size along the column direction of the pixels 11 is represented by CP, while the width-wise size along the column direction is represented by RP. The pitch CP is equal to the width-wise size of each discharge channel 5. On the other hand, the pitch RP is equal to the width-wise size of each signal electrode 10. The signal electrodes 10 are electrically isolated from one another and are also optically separated by a black mask BM formed in the color filter 13.

Referring to FIG. 1c, each pixel 11 is a rectangle having a longitudinal size CP and a width-wise size RP. The electro-optical device 9 is a set of finely partitioned crystal areas 15 which are controlled in orientation axis-symmetrically. As may be seen from the drawing, the liquid crystal areas 15 are arrayed continuously, at least along the column direction, at a constant pitch DP finer than the arraying pitch CP. Each liquid crystal area 15 is made up of a liquid crystal domain delimited by meshlike partitions 17. The liquid crystal domain is controlled in orientation axis-symmetrically by the wall surface effect of the partitions 17. Each liquid crystal area 15 is of a small area and square in profile. A plurality of liquid crystal areas 15 are arranged in the pixel 11 which is of a larger area and rectangular in profile.

In FIG. 1d, plural liquid crystal areas 15 are shown schematically. In contradistinction from the state shown in FIG. 1c, the relative positions of the pixels 11 and the liquid crystals 15 in the column direction are offset. In this offset state, the effective aperture of the pixels is not affected, that is, there is no difference in the effective aperture of the pixels between the states in FIG. 1c and that in FIG. 1d. Stated differently, there is no necessity for relative position registration (alignment) between the pixels 11 and the liquid crystal areas 15.

FIG. 2 s a schematic view illustrating an arraying pattern of the liquid crystal areas 15. In FIG. 2, SMP1 denotes a first embodiment n which about 10 columns by three rows of the liquid crystal areas 15 are contained in each pixel 11. On the other hand, SMP2 shows a second embodiment in which the liquid crystal areas 15 are divided more finely in a mesh pattern than in SMP1. In SMP2, approximately 14 rows by 3 columns of the liquid crystal areas 15 are contained in each pixel 11. Similarly, SMP3 denotes a third embodiment in which, contrary to SMP2, the liquid crystal areas 15 are coarser in density. In each pixel 11 are contained six rows by two columns of the liquid crystal areas 15. In FIG. 2, Ref means a reference embodiment. Although two liquid crystal areas 15 are contained in each pixel 11, these are not arrayed continuously at a constant pitch. As described above, each discharge channel 5 has discharge electrodes which are parallel to each other and opposite in polarity (an anode electrode A and a cathode electrode K) and which delimit therebetween a physical aperture for the pixel. Since two separate physical apertures are present on both sides of the center cathode electrode K, two separate physical apertures exist for each pixel. The present invention, however, is not limited to this configuration since it is also applicable to a discharge channel comprised of a pair of anode electrodes A and a cathode electrode K, in which case there exists a sole physical aperture per pixel. In the reference embodiment REF, a liquid crystal area 15 (optical aperture) is arranged in registration with the physical aperture. The effective aperture of the pixel 11 is provided at an overlapped portion of the physical aperture and the optical aperture. As may be seen from the drawing, the effective aperture is contracted in the reference embodiment if the physical aperture and the optical aperture are relatively offset from each other. Conversely, in the present embodiments SMP1, SMP2 and SMP3, the arraying pitch of the liquid crystal areas 15 is set so as to be fine so that the amount of light transmitted through the pixel will be substantially constant irrespective of the relative positions between the physical aperture and the optical aperture in the column direction.

In SMP1 to SMP3, the optical apertures of uniform size are arrayed. The present invention, however, is mot limited to this configuration. The "alignment free" effect can be realized if optical apertures of different sizes co-exist on the condition that the arraying pitch is selected to be finer than the pixel. The optical apertures may also be arranged in a mesh shape as in SMP1 and SMP2 or in a lattice shape as in SMP3. In SMP1 and SMP2, the apparent repetition pattern pitch is smaller than the arraying pitch DP to reduce the moire between the physical aperture and the optical aperture. There is also no necessity of arraying the optical apertures at a constant pitch only in the row direction since the optical apertures may be arranged continuously in the entire picture at a constant pitch in the column direction as well. By forming liquid crystal areas delimited by partitions of the honeycomb structure, the "alignment-free" structure may be obtained not only in the row direction but also in the column direction.

Figure 3:
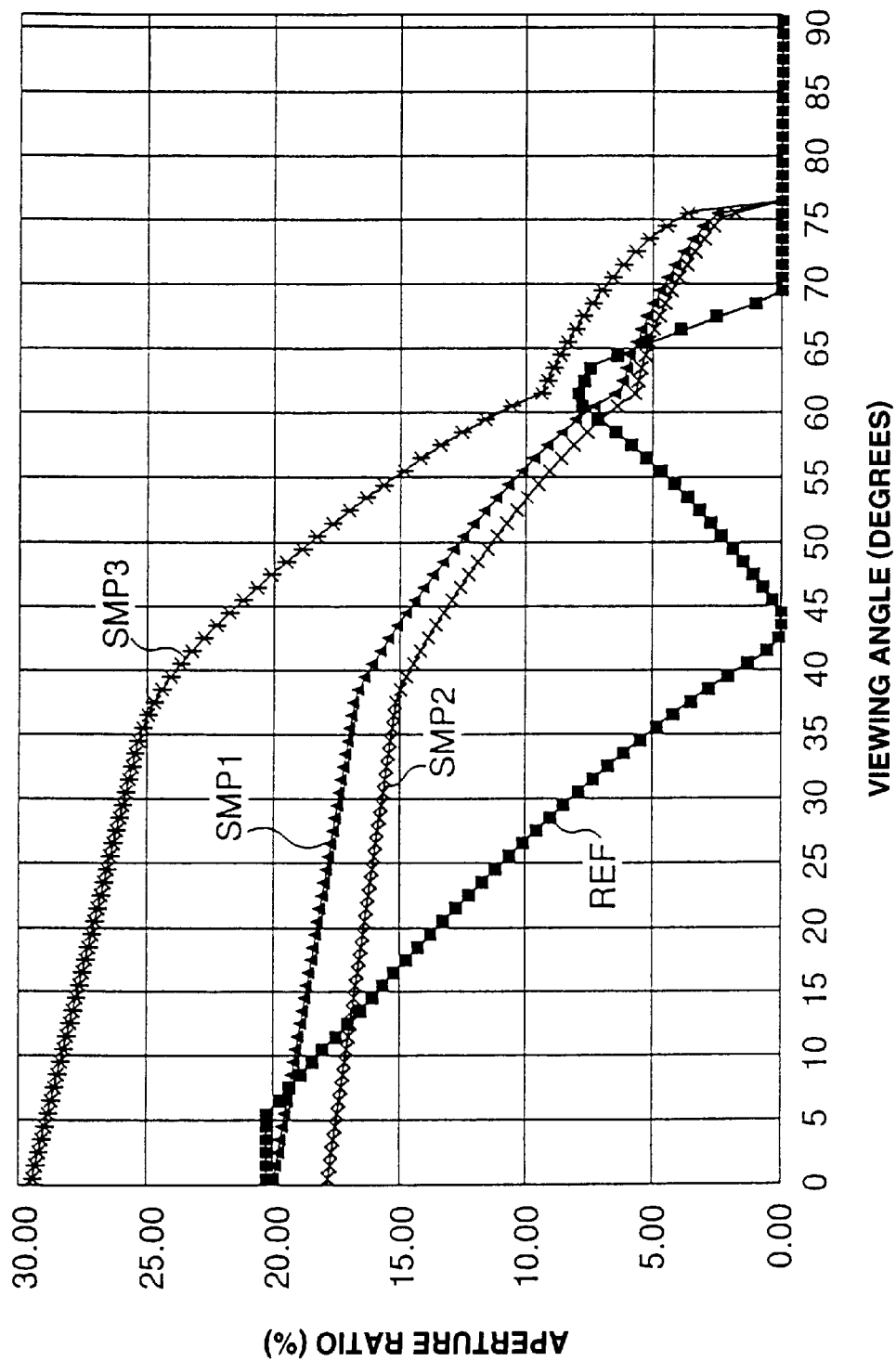
FIG. 3 is a graph showing viewing angle dependency of the aperture ratio of the plasma address liquid crystal display device.

In FIG. 3, which is a graph showing the relation between the viewing angle and the aperture ration, there is shown the viewing angle dependency of the aperture ratio. The zero degree of the viewing angle is the normal-line direction of the flat panel, with the viewing angle becoming larger the more the viewing angle is tilted from this normal line position. The aperture ratio is the ratio of the volume of the outgoing light to the volume of the entire incident light in percentage (%) and corresponds to the effective aperture area. In SMP1 to SMP3, the aperture ratio becomes smaller the larger becomes the viewing angle. This, however, presents no practical inconvenience because the transmitted light may be obtained up to the viewing angle of substantially 75°. With SMP3, the volume of transmitted light is larger than with SMP1. As may be seen from comparison of the pattern of SMP1 to the pattern of SMP3, the transmitted light volume becomes larger the finer the division of the liquid crystal areas 15. Conversely, the aperture ratio becomes lower in SMP2 than in SMP1. As may be seen from FIG. 2, the division of the liquid crystal areas 15 is finer in SMP2 than in SMP1, with the result that the area ratio of the partitions 17 becomes correspondingly larger at the sacrifice of the aperture ratio. However, SMP2 is meritorious in that it is flattened out in the viewing angle dependency of the aperture ratio more significantly than in SMP1. Conversely, with the reference embodiment REF, the aperture ratio is 0% when the viewing angle is 45°, such that the incident light is interrupted completely. This renders picture display impossible. If the viewing angle is increased further, the aperture ratio is slightly recovered in the vicinity of 60°, however, it again falls to 0% in the vicinity of 70%. With the structure of the reference embodiment REF in which the physical aperture is brought into registration with the optical aperture, the aperture ratio is drastically decreased if the viewing angle reaches a defined range. With the embodiments of the present invention, the aperture ratio is not decreased to 0% over the range of the viewing angle of approximately 75°.

Figure 4:
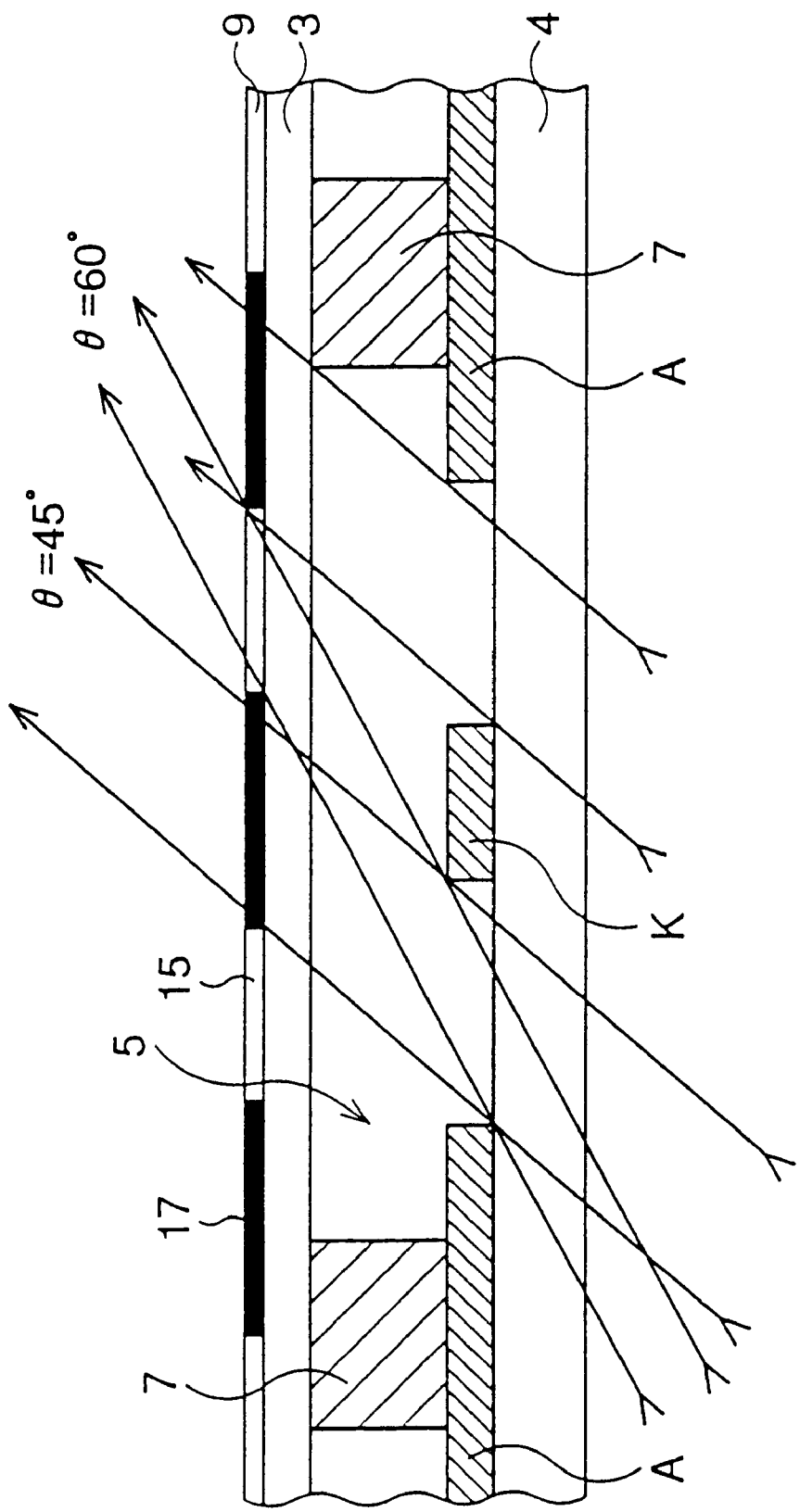
FIG. 4 is a partial schematic cross-sectional view showing viewing angle dependency of the aperture ratio of the plasma address liquid crystal display device.

FIG. 4 schematically shows the cross-sectional structure of the reference embodiment REF. There is formed a physical aperture between the anode electrode A and the cathode electrode K. Directly above and in register with the physical aperture is arrayed the liquid crystal area 15 to provide an optical aperture. The optical apertures is surrounded by the partition 17. Since the discharge channel 5 is interposed between the physical aperture and the optical aperture, there is produced parallax therebetween if the two apertures are observed from an oblique direction. If the parallax is 0°, the incident light is passed through the physical aperture to reach the optical apertures directly, so that the designed aperture ratio can be achieved. However, if the viewing angle θ reaches 45°, the parallax between the two apertures becomes significant so that the oblique incident light traversing the physical aperture is deviated from the corresponding optical aperture to fall on the partition 17. Therefore, the aperture ratio is 0. If the viewing angle is increased so that θ=60°, the oblique incident light traverses the neighboring optical aperture so that the aperture ratio is increased transiently.

Figure 5:
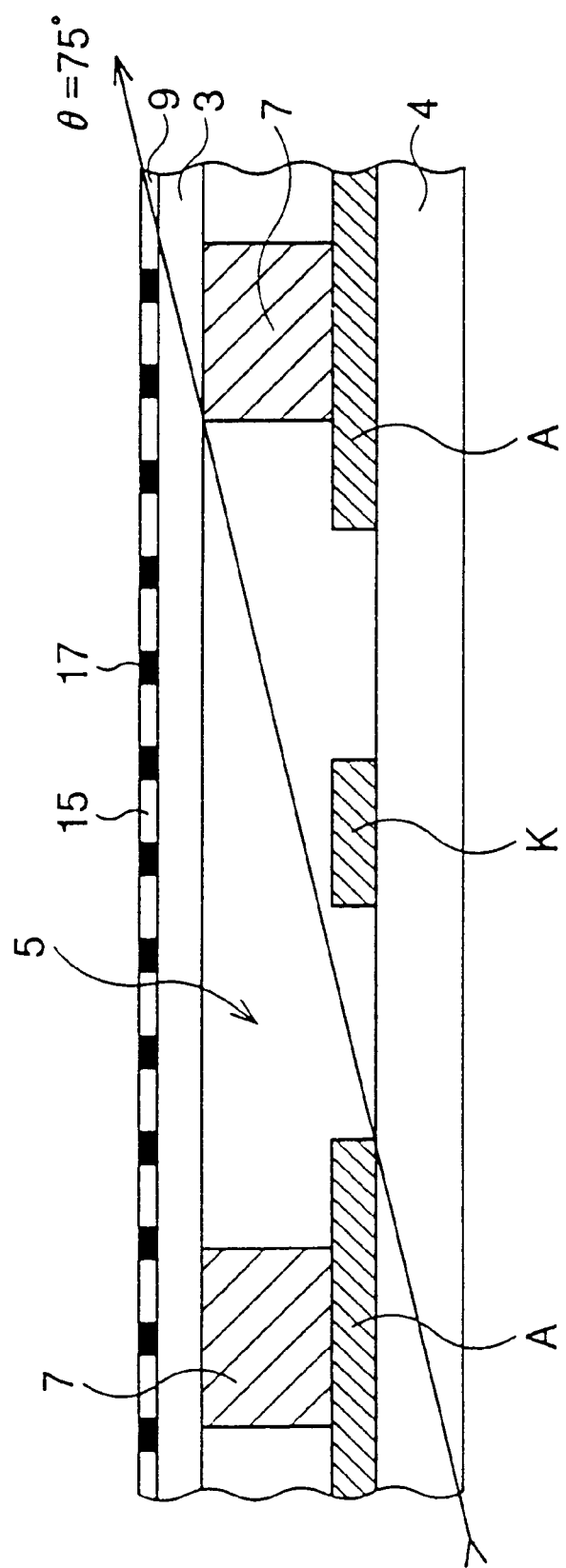
FIG. 5 is a partial cross-sectional view showing viewing angle dependency of the aperture ratio of the plasma address liquid crystal display device.

FIG. 5 schematically shows the cross-sectional structure of the embodiment SMP1. Since the optical aperture is divided finely as compared to the physical aperture, there is no necessity of achieving registration between the two apertures. Since the light incident in the oblique direction from the physical aperture can traverse an arbitrary one of the optical apertures irrespective of the viewing angle, the aperture ratio is not equal to 0% over a wide range of the viewing angle. If the viewing angle θ approaches 75°, the oblique incident light traversing the physical aperture is kicked by the partition 7 so that, at this stage, the aperture ratio is equal to 0%.

Figure 6:
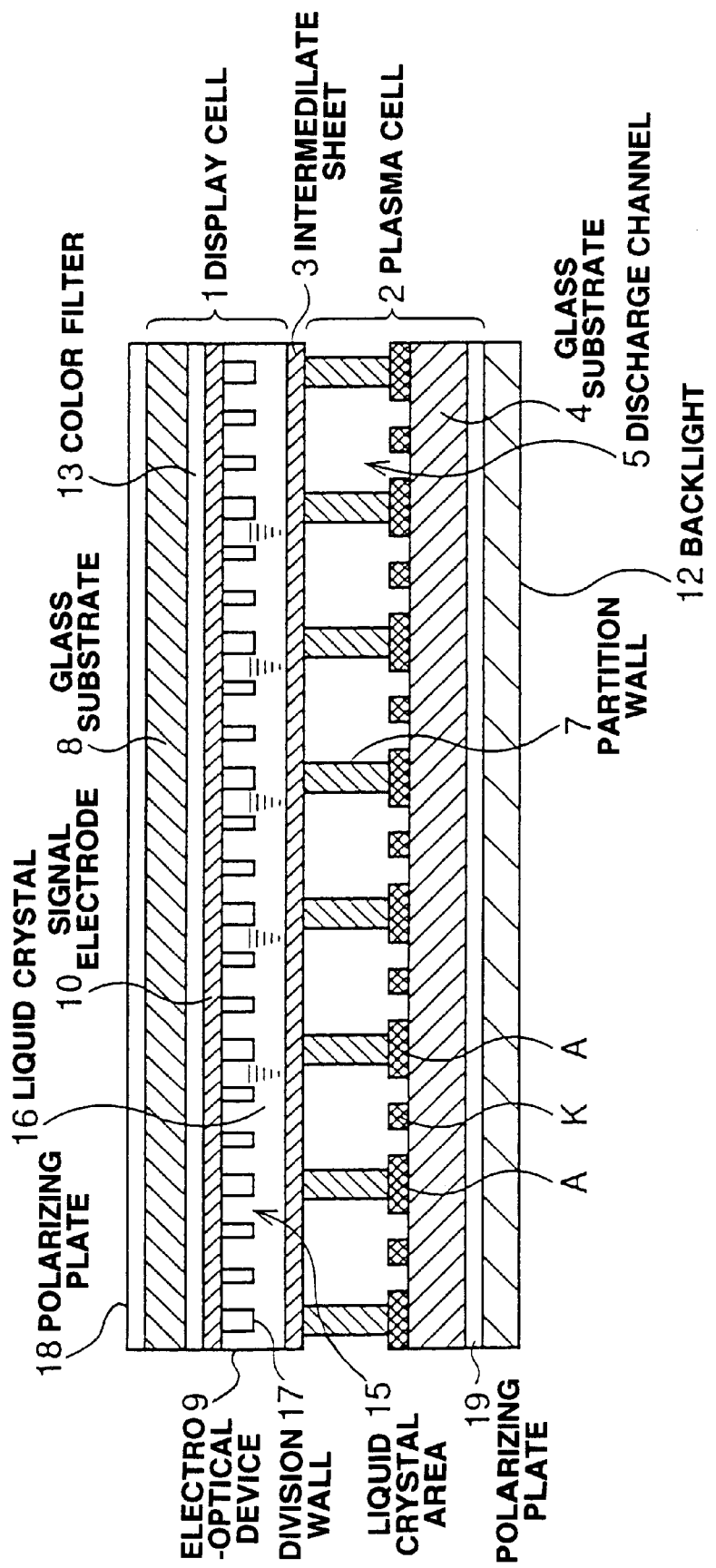
FIG. 6 is a cross-sectional view showing a specified structure of the plasma address liquid crystal display device according to the present invention.

FIG. 6 is a cross-sectional view showing an illustrative structure of a plasma address liquid crystal display device according to the present invention. As shown therein, the present display device has a flat panel structure including the display cell 1, plasma cell 2 and the intermediate sheet 3 interposed therebetween. The intermediate sheet 3 is an ultra-thin glass plate and termed a micro-sheet. The plasma cell 2 is made up of the lower glass substrate 4, bonded to the intermediate sheet 3, with an ionizable gas being sealed in a gap defined in-between. On the inner surface of the lower glass substrate 4 are formed stripe-shaped discharge electrodes. These discharge electrodes alternately operate as anode electrodes A and cathode electrode K. The discharge electrodes can be printed on firing on the flat glass substrate 4 by, for example, a screen printing method, thus assuring superior productivity and workability. The partitions 7 are formed along and directly above the anode electrodes A and the discharge channels 5 are defined by partitioning the gap charged with the ionizable gas. These partitions 7 also can be formed by the screen printing method, with the top sides thereof compressing against the surface of the intermediate sheet 3. Within the discharge channel 5, surrounded by the paired partitions 7, plasma discharge is generated between both side anode electrodes A and the intermediate cathode electrodes K. The intermediate sheet 3 and the lower side glass substrate 4 are bonded to each other by, for example, glass frit.

On the other hand, the display cell 1 is constituted using the transparent upper glass substrate 8. This glass substrate 8 is bonded to the opposite side surface of the intermediate sheet 3, via a gap therebetween, using a sealing agent, and liquid crystal 16 as electro-optical device 9 is charged in the gap. The electro-optical device 9 is a set of finely partitioned liquid crystal domains, as explained previously. Each liquid crystal area 15 is controlled in orientation axis-symmetrically and is made up of liquid crystal domains partitioned finely by the lattice-shaped partitions 17. The liquid crystal domains are controlled in orientation axis-symmetrically by the wall surface effect of the partitions 17. On the inner surface of the upper glass substrate 8 are formed the signal electrodes 10. At the points of intersection of the signal electrodes 10 and the discharge channels 5 are formed pixels in a matrix configuration. On the inner surface of the glass substrate 8, there is also provided the color filter 13 for allocating the three prime colors to the pixels. The flat panel structure, having the above-described structure, is of the transmitting type, such that, for example, the plasma cell 2 and the display cell 1 are arranged on the light incident side and on the light outgoing side, respectively. A back side light 12 is mounted on the plasma cell 2. In addition, paired polarizing plates 18, 19 are arranged for sandwiching the display cell 1 from the upper and lower sides.

These polarizing plates 18, 19 are arranged in, for example, a cross-Nicol configuration.

In the above-described plasma address liquid crystal display device, the discharge channel 5 arranged in rows for plasma discharge are changed over line-sequentially for scanning. In synchronism with this scanning, picture signals are applied to the columns of the signal electrodes 10 on the side of the display cell 1 to effect display driving. If plasma discharge is produced in the discharge channels 5, the inside of the discharge channels 5 is substantially uniformly at an anode potential, and pixel selection is made on the row basis. That is, the discharge channel 5 operates as a sampling switch. If picture signals are applied to each pixel in the on-state of the plasma sampling switch, sampling is caused to occur to control the pixel turning-on or turning-off. The picture signals are directly maintained in the pixels after the plasma sampling switch is turned off. That is, the display cell 1 is responsive to the picture signals to modulate the incident light from the back light 12 into outgoing light for picture display.

Figure 7:
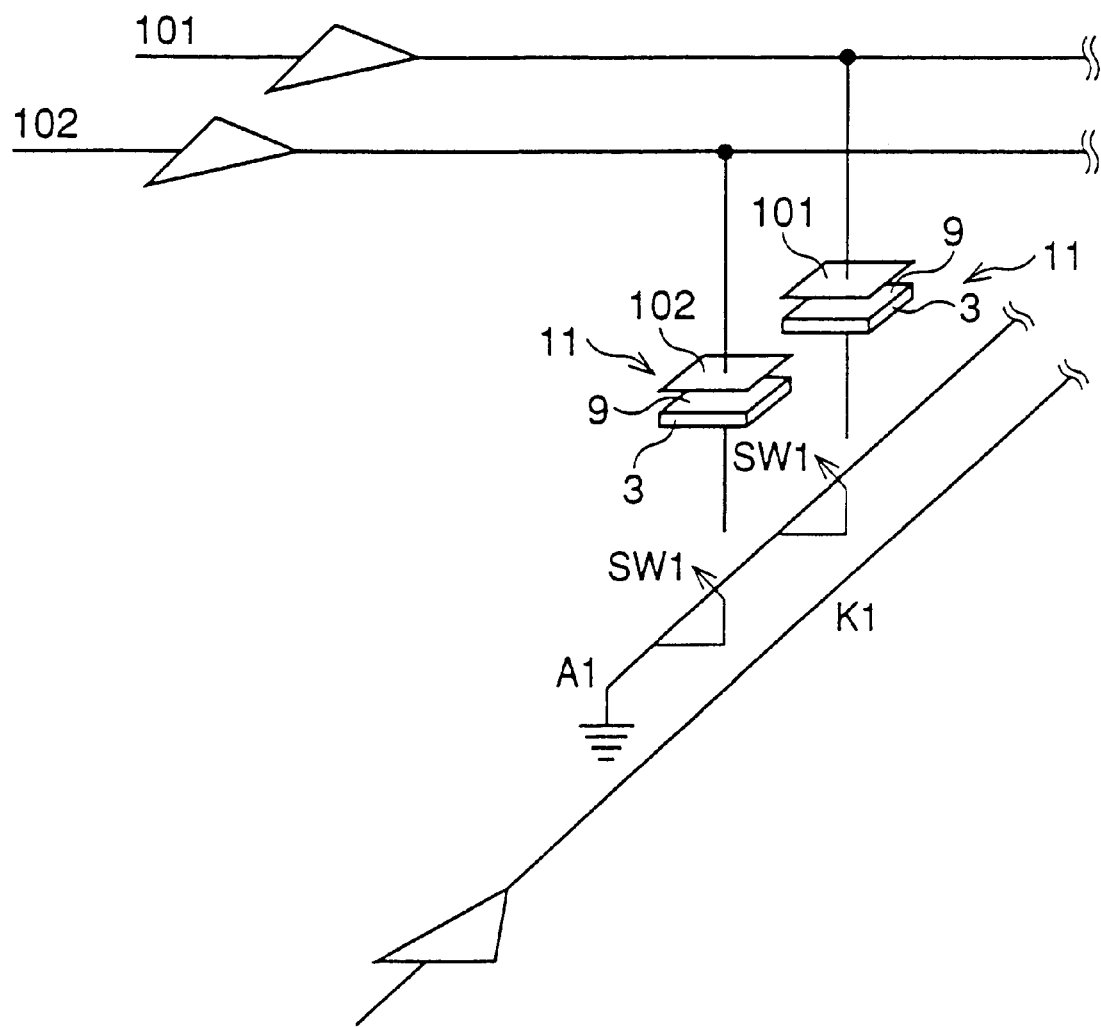
FIG. 7 is a schematic view for illustrating the operation of the plasma address liquid crystal display device shown in FIG. 6.

FIG. 7 is a schematic view showing only two separated pixels. That is, two signal electrodes 10, a cathode electrode K1 and an anode electrode A1 are shown for assisting the understanding. Each pixel 11 has a layered structure of signal electrodes 101, 102, a electro-optical device 9, an intermediate sheet 3 and a discharge channel. The discharge channel is coupled to substantially the anode potential during plasma discharge. If, in this state, the picture signals are applied across the signal electrodes 101, 102, electrical charges are injected into the electro-optical device 9 and the intermediate sheet 3. If the plasma discharge comes to a close, the discharge channel reverts to the insulated state, so that the floating potential prevails to keep the injected charges in each pixel 11 by way of performing a so-called sample-holding operation. Since the discharge channel thus operates as a sampling switch element provided on each pixel 1, it is schematically represented by a switch symbol SW1. On the other hand, the electro-optical device 9 and the intermediate sheet 3 held between the signal electrodes 101, 102 and the discharge channel operate as a sampling capacitor. If the sampling switch SW1 is turned on by line-sequential scanning, the picture signals are held by the sampling capacitor to turn the pixels on or off depending on the signal voltage level. The signal voltage is held by the sampling capacitor even after the sampling switch SW1 is turned off in order to effectuate an active matrix operation of the display device. In actuality, the effective voltage applied to the electro-optical device 9 is determined by capacity division with the intermediate sheet 3.

Figure 8:
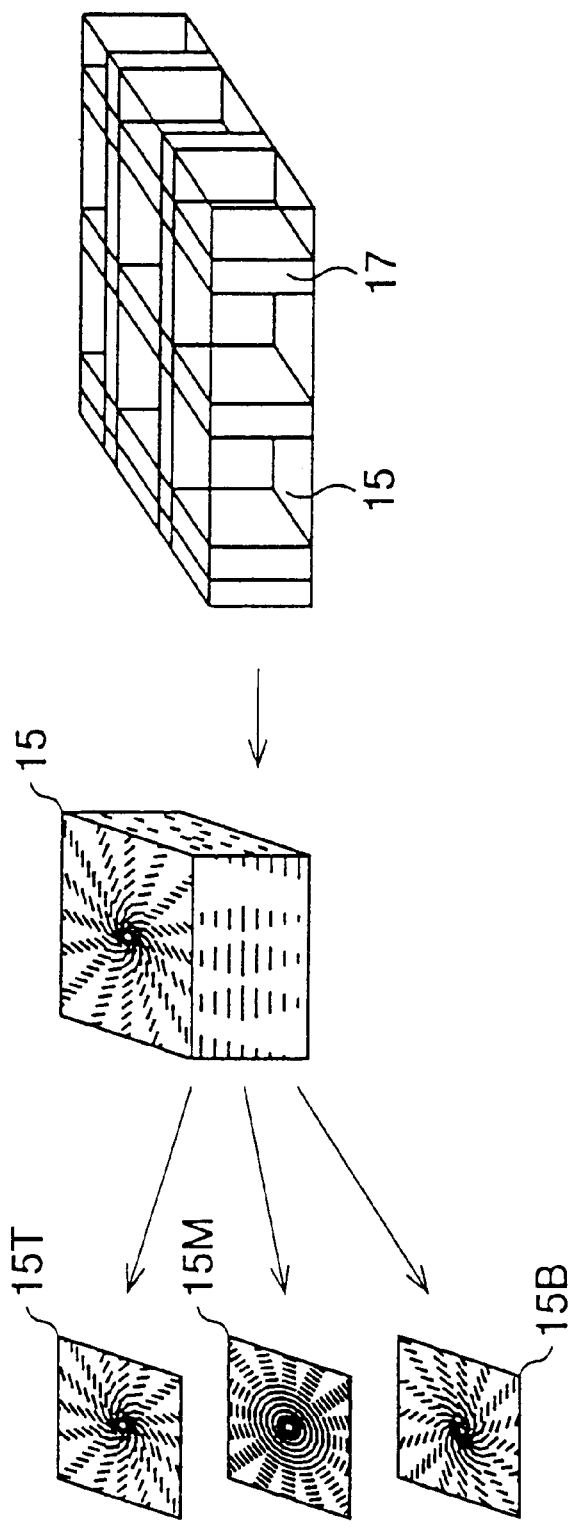
FIGS. 8a to 8c are schematic views showing modelled liquid crystal areas formed in the display cell of the plasma address liquid crystal display device shown in FIG. 6.

Following the foregoing description of the plasma cell, the display cell is explained in detail. FIG. 8 is a schematic view showing a modelled liquid crystal domain formed in the display cell (in the lit state). As shown in FIG. 8a, the liquid crystal area 15 is divided in a lattice pattern by the partitions (orientation wall sections) 17. Although the partitions 17 completely divide the liquid crystal area 15 across the upper and lower substrates, this is merely illustrative and is not intended to limit the invention. If the partitions 17 are partial partitions having the height smaller than the separation between the upper and lower substrates, axis-symmetrical orientation can be sufficiently realized. The liquid crystal contained in the liquid crystal area 15 is previously charged with chiral substances. FIG. 8b schematically shows a sole liquid crystal domain as sliced. In FIG. 3b, solid lines indicate directors of the liquid crystal molecules. As may be seen from this figure, the liquid crystal area 15 is controlled in orientation axis-symmetrically. Although there are many variations of the axis-symmetrical orientation, the present embodiment exploits the mode of axis-symmetrical orientation in which the directors of the liquid crystal molecules are arranged spirally. FIG. 8c schematically shows a spiral array of the directors of the liquid crystal molecules in upper, intermediate and lower layers of the liquid crystal domains. In an upper layer 15T of the liquid crystal area 15, the liquid crystal molecule directors are arrayed spirally. In the mid layer 15M, the directors of the individual liquid crystal molecules are rotated substantially 45° under the effect of the chiral substances, the directors are arrayed radially in their entirety. In the lower layer 15B, the liquid crystal molecule directors are further rotated 45° so that the liquid crystal area again takes the state of spiral orientation. Thus, in the present embodiment, the directors of the liquid crystal molecules are twisted 90° in a direction from the upper layer towards the lower layer as the liquid crystal domains are maintained in the axis-symmetrical orientation. Thus, the liquid crystal domains exhibit light-rotating capability of 90° with respect to the linear polarization. Since the liquid crystal domains are of the axis-symmetrical orientation and the liquid crystal molecules optically compensate one another in the liquid crystal area 15, substantially uniform viewing angle characteristics can be realized for all direction without dependency upon the direction of linear polarization. Among the modes of axis-symmetrical orientation, there are a P-type mode in which the state of initial orientation (applied voltage off state) is the axis-symmetrical orientation and the N-type mode in which the orientation is the axis-symmetrical orientation or the perpendicular orientation in the applied voltage on state or in the applied voltage off state, respectively. The present invention can be applied to both of these modes.

Figure 9:
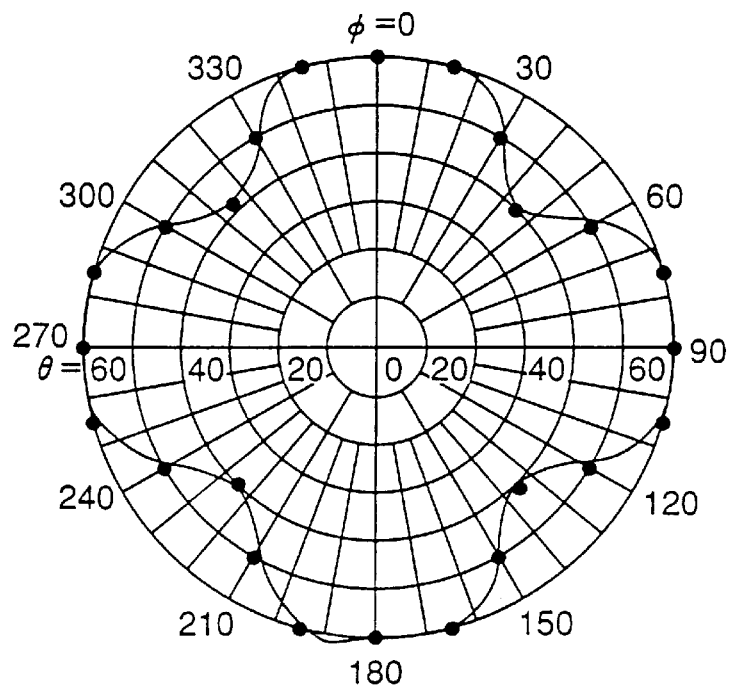
FIG. 9 is a graph showing the viewing angle dependency of contrast of the plasma address liquid crystal display device according to the present invention.

FIG. 9 is a graph showing the viewing angle dependency of the display cell 1. The azimuth angle $\phi$ with respect to the screen is taken in the circumferential direction, while an inclination angle with respect to the normal line to the screen (viewing angle $\theta$) is taken in the radial direction. The azimuth angles of 0°, 180°, 90° and 270° correspond to the upper, lower, right and left sides of the screen, respectively. In this graph, the viewing angles $\theta$ which give contrast higher than a constant contrast value are plotted over the entire azimuth angles to describe an equi-contrast curve. Meanwhile, the axis of polarization of the polarizing plate 18 is set to the direction of 0° to −180° in terms of the azimuth angle, while that of the polarizing plate 19 is set to 90°−−270° direction in terms of the azimuth angle. As may be seen from this graph, constant contrast can be achieved even if the viewing angle is tilted up to 60° with respect to the upper, lower left and right directions.

Figure 10:
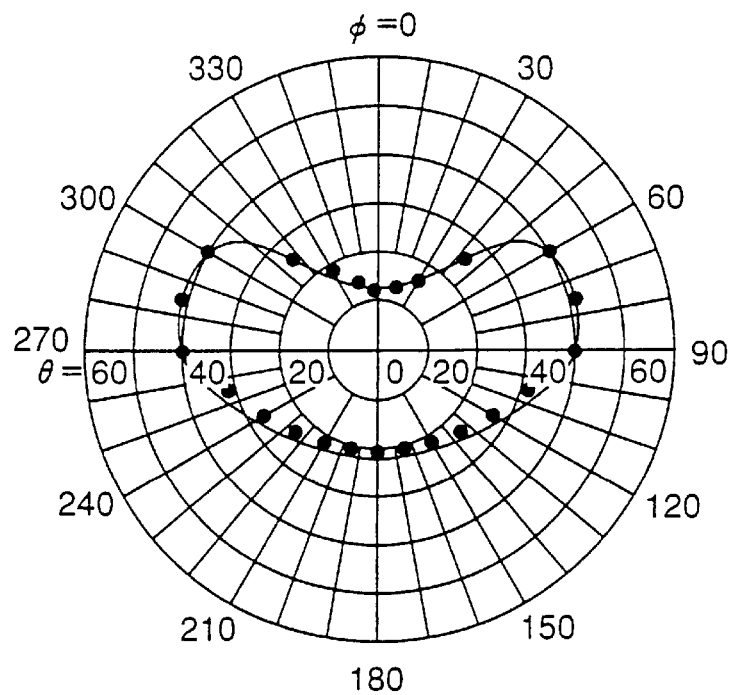
FIG. 10 is a graph showing the viewing angle dependency of contrast of a conventional plasma address liquid crystal display device.

FIG. 10 shows a graph illustrating the viewing angle dependency of the display cell exploiting the conventional TN mode. As may be seen from comparison with the graph of FIG. 9, drastic viewing angle anisotropy is recognized with the use of the TN mode.

Figure 11A:
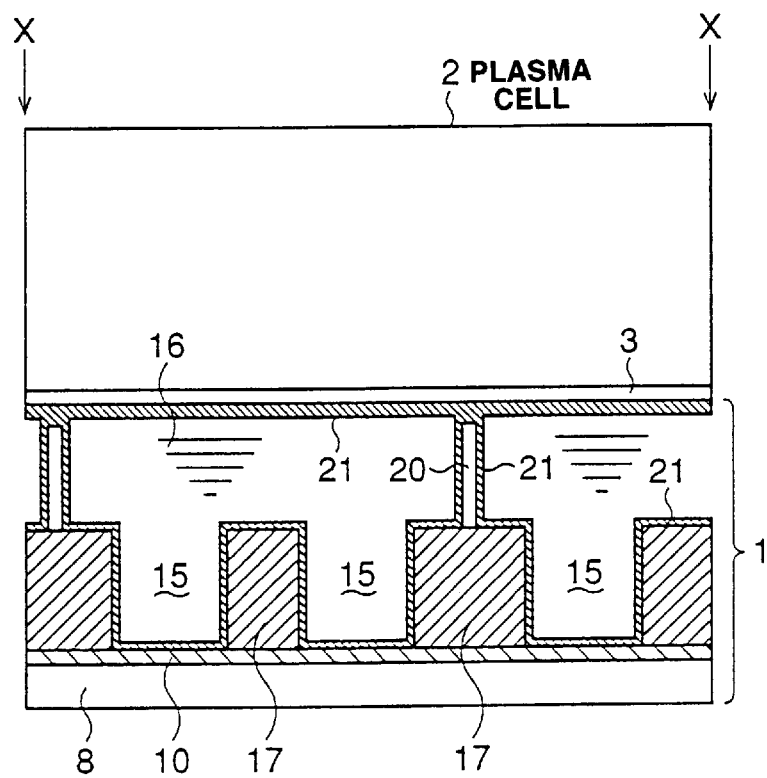
FIG. 11a is a cross-sectional view showing a specified embodiment of a display cell constituting the plasma address liquid crystal display device shown in FIG. 6.
Figure 11B:
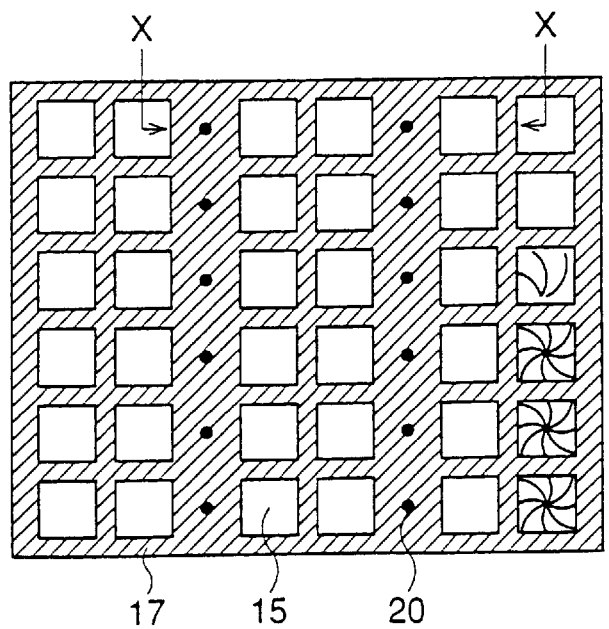
FIG. 11b is a plan view showing the specified embodiment of the display cell constituting the plasma address liquid crystal display device shown in FIG. 6.

FIG. 11 is a schematic view showing an illustrative structure of the display cell exploiting the N type mode. Specifically, FIG. 11b is a plan view of the display cell 1 and FIG. 11a is a cross-sectional view of the display cell 1, taken along line X—X of FIG. 11a. As shown in FIG. 11a, the plasma cell 2 and the display cell 1 are interconnected via the intermediate sheet 3 to constitute a plasma address liquid crystal display device. The drawing of FIG. 11 is turned upside-down with respect to that of the cross-sectional view of FIG. 6 for assisting the understanding. The intermediate sheet 3 and the glass substrate 8 are bonded together with a defined gap in-between, with a liquid crystal material 16 being charged into the gap. The inner surface of the intermediate sheet 3 is coated with a perpendicular orientation agent 21, such as polyimide. On the inner surface of the glass substrate 8 are formed stripes of the signal electrodes 10, which are obtained by patterning a transparent electrically conductive film, such as an ITO film. On the signal electrodes 10 are formed partitions 17 which are formed by light exposure and development of a photosensitive resin using a defined mask. Those areas of the surface surrounded by the partitions 17 represent liquid crystal areas (liquid crystal domains) 15. On the partitions 17 are selectively formed columnar-shaped protrusions 20 the upper ends of which compress against the lower surface of the intermediate sheet 3 to serve as spacers. The columnar-shaped protrusions 20 also can be formed by, for example, light exposure and development of a photosensitive resin material. The surface of the glass substrate 8, on which are formed the signal electrodes 10, partitions 17 and the columnar-shaped protrusions 20, is also coated with a perpendicular orientation agent 21, such as polyimide. The gap between the glass substrate 8 and the intermediate sheet 3 is of the order of, for example, 3 $\mu$m. By providing the upper ends of the partitions 17 with the columnar-shaped protrusions 20, it is possible to maintain a constant separation between the glass substrate 8 and the intermediate sheet 3 over the entire screen.

The partitions 17 are patterned in the shape of a lattice for delimiting liquid crystal areas 15 in respective partitioned portions, as shown in FIG. 11b. In FIG. 11b, liquid crystal areas corresponding to three pixels are shown. To each pixel, a 6-row 2-column liquid crystal area 15 is allocated in accordance with SMP3 of FIG. 2. The columnar-shaped protrusions 20 are patterned for partitioning each pixel on the column basis. Although the pattern of the partitions 17 is continuous, that of the columnar-shaped protrusions 20 is discrete. Therefore, the individual liquid crystal domains are not completely separated or isolated but communicate with one another. By such arrangement, the liquid crystal 16 can be furnished easily to the liquid crystal areas 15. It is noted that the pattern of the partitions 17 is substantially coincident with the pattern of the black mask of the color filter. The right lower area of FIG. 11b shows the state of orientation of each liquid crystal area 15. This pattern is obtained by observing the display cell by a polarization microscope with a cross-Nicol prism in-between. Although the majority of the liquid crystal areas present the axis-symmetrical orientation, some of the liquid crystal areas are of random orientation. If the liquid crystal areas are not of axis-symmetrical orientation in their entirety, optimum viewing angle characteristics are obtained. In certain liquid crystal areas, random orientation other than the axis-symmetrical orientation are partially formed under the effect of, for example, an electrode. However, no practical inconveniences have been recognized with regard to viewing angle characteristics or granular feeling on the screen.

FIG. 12 is a process diagram showing the manufacturing method of the display cell shown in FIG. 11. First, at step (a) in FIG. 12, a color filter and a signal electrode are formed on one surface of the glass substrate 8. The glass substrate 8 is shown only schematically such that the signal electrode and the color filter are not specifically shown. At step (b), partitions 17 are formed in a lattice configuration on the surface of the glass substrate 8. These partitions 17 can be formed by coating of the photosensitive resin followed by light exposure and development (photolithography) via a photomask having a latticed pattern. At step (c), columnar-shaped protrusions 20 are discretely formed on the top of the partitions 17, possibly by photolithography. At the next step (d), the surfaces of the surface of the glass substrate 8 formed with the partitions 17 and the columnar-shaped protrusions 20 are coated with a perpendicular orientation agent 21, such as polyimide. In parallel with the above steps (a) to (d), the plasma cell 2 is prepared at step (e). The plasma cell 2 is comprised of a glass substrate and an intermediate sheet defining a discharge channel in-between. In the drawing, the plasma cell 2 is shown in a simplified manner, and has an intermediate sheet on its lower side. At a step (f), the perpendicular orientation agent 21 is applied on the surface of the intermediate sheet of the plasma cell 2.

At a step (g), the plasma cell 2 and the glass substrate 8 are unified together. The gap between the plasma cell 2 and the columnar-shaped protrusions 20 can be controlled to a constant value over the entire screen by the partitions 17 and the columnar-shaped protrusions 20. The inner surface of the display cell is coated in its entirety by the perpendicular orientation agent 21. At a step (h), the liquid crystal 19 is injected into the inside of the display cell by, for example, the vacuum injection method. In actuality, the liquid crystal 16 is a mixture of a N-type nematic liquid crystal material, a chiral substance, monomer and a photo-initiator. Finally, at step (i), the liquid crystal areas 15 are controlled in orientation axis-symmetrically. Finally, at step (i), the liquid crystal areas 15 are controlled in orientation axis-symmetrically. First, a defined ac voltage is applied across the liquid crystal 16 and the liquid crystal molecules are brought to the state of axis-symmetrical orientation by exploiting the wall surface effect of the partitions 17. For fixing the state of this axis-symmetrical orientation, UV light rays are illuminated by, for example, a high-pressure mercury lamp. This photo-polymerizes the monomer to hold on memory the axis-symmetrical orientation of the liquid crystal areas 15.

Figure 13:
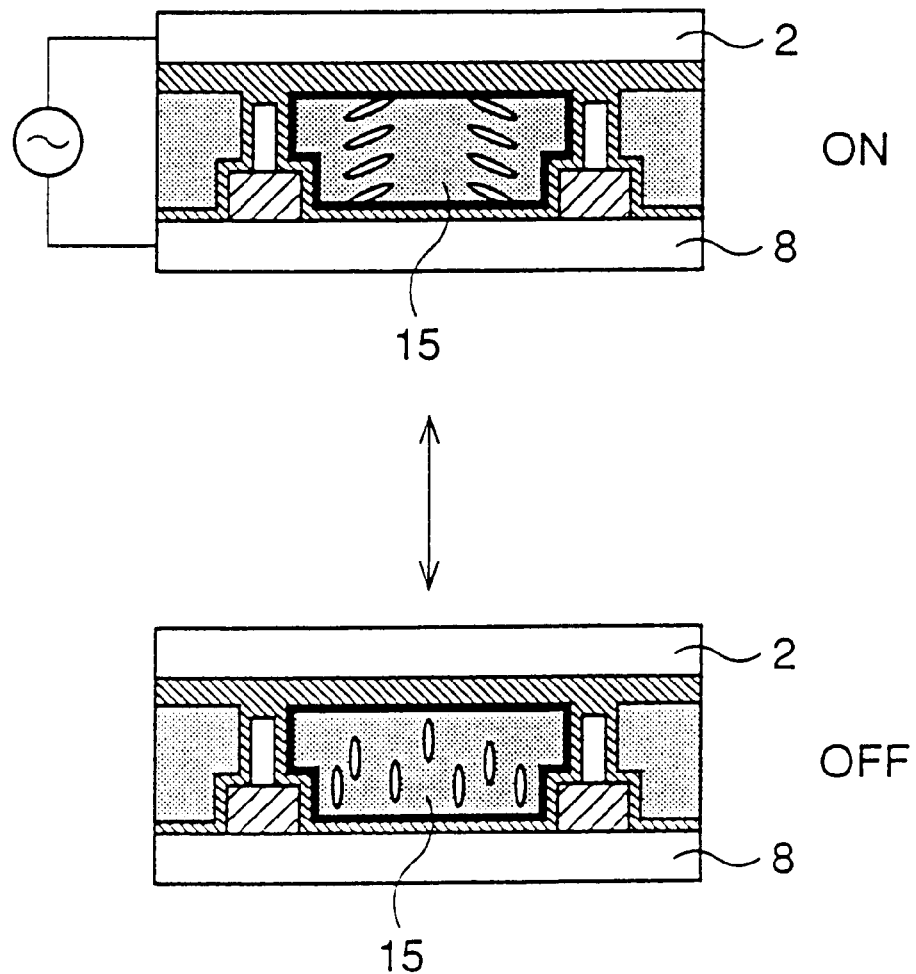
FIG. 13 is a schematic view for illustrating the operation of a display cell.

FIG. 13 schematically shows the operation of the display cell produced by the manufacturing method shown in FIG. 12. In the on-state in which the voltage is applied, the axis-symmetrical orientation is maintained in the liquid crystal area 15. In the off-state in which the applied voltage is turned off, the liquid crystal molecules contained in the liquid crystal areas 15 transfer to perpendicular orientation. The state of the cell can be switched from the on-state to the off-state by turning the applied voltage on and off. Using a polarizing plate, the phase change between the axis-symmetrical orientation and the perpendicular orientation can be taken out as changes in transmission ratio in order to make display.

Figure 14:
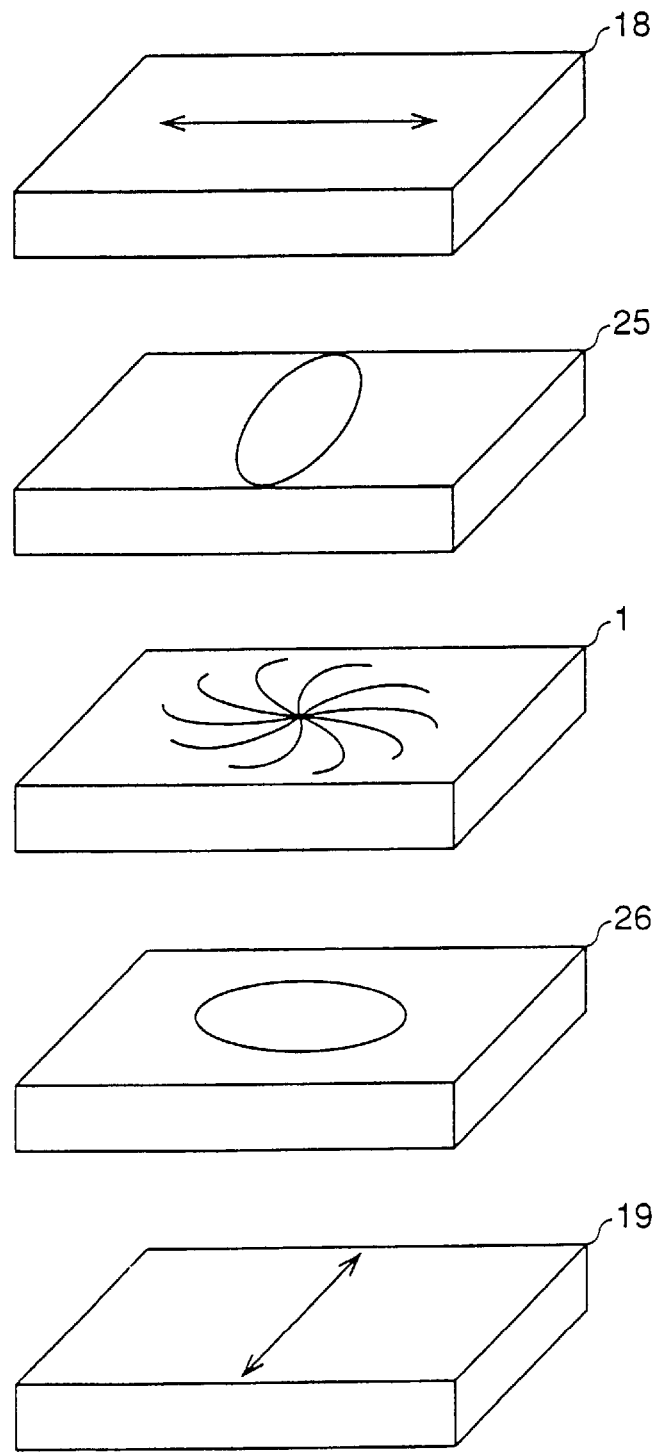
FIG. 14 is a schematic view showing the optical function of the display cell.

FIG. 14 schematically shows the optical functions of the display cell 1 employing the axis-symmetrical orientation. On the upper and lower sides of the display cell 1 are arranged polarizing plates 18, 19, respectively. The polarisation axes of the polarizing plates 18, 19 are perpendicular to each other and arranged in a cross-Nicol orientation. A phase difference plate 25 and a phase difference plate 26 are arranged between the display cell 1 and the polarizing plate 18 and between the display cell 1 and the polarizing plate 19, respectively. These phase difference plates 25, 26 are used for compensating the phase difference produced when the light falls from a direction inclined with respect to the liquid crystal molecules maintained in the state of perpendicular orientation. In particular, the compensation effect is significant if the light falls on the liquid crystal molecules from a direction inclined 45° relative to the polarization axis of the polarizing plate. As the polarizing plates 25, 26, negative biaxial double-refraction plates, for example, may be used. The display cell 1 is shown in the axis-symmetrical orientation. However, the directors of the liquid crystal molecules are rotated 90° along the axial direction. The linear-polarized light, passing through the upper polarizing plate 18, has its polarizing axis rotated 90° by the display cell 1 to pass through the polarizing plate 19 arranged in the cross-Nicol configuration. This gives bright display. If the display cell 1 transfers from the axis-symmetrical orientation to the perpendicular orientation, the capability of light rotation for the linear polarized light is lost. Therefore, the linear polarized light traversing the polarizing plate 18 directly reaches the polarizing plate 19. Since the linear polarized light is perpendicular relative to the polarization axis of the polarizing plate 19, the incident light is interrupted to give dark display.

What is claimed is:

1. A liquid crystal display apparatus including a matrix array of pixels of a predetermined pitch and switching elements driving the respective pixels, in which a electro-optical device is driven from pixel to pixel to make a display of an active matrix type display, wherein said electro-optical device is a set of finely partitioned liquid crystal areas, at least part of which is controlled in orientation axis-symmetrically, and wherein said liquid crystal areas are continuously arrayed at a pitch finer than the arraying pitch of the pixels.

2. The liquid crystal display apparatus according to claim 1 further comprising a flat panel structure including a display cell and a plasma cell bonded to each other with an intermediate sheet in-between, said plasma cell having a plurality of discharge channels extending along the row direction, said display cell having the electro-optical device and a plurality of signal electrodes extending along the column direction, with the matrix of the pixels being defined at points of intersection of said signal electrodes with said discharge channels, said liquid crystal areas being continuously arrayed at a pitch finer than the arraying pitch of pixels in at least the column direction.

3. The liquid crystal display apparatus according to claim 2 wherein the discharge channels include discharge electrodes of alternately opposite polarities extending parallel to one another, a physical aperture for a pixel being defined between neighboring discharge electrodes of opposite polarities, each liquid crystal area being an optical aperture for a pixel and wherein the arraying pitch of the liquid crystal areas is set so as to be fine enough to provide a substantially constant light transmission volume of the pixel without regard to the relative position between the physical aperture and the optical apertures in the column direction.

4. The liquid crystal display apparatus according to claim 2 wherein each liquid crystal area is a liquid crystal domain finely partitioned by lattice- or mesh-shaped partitions and wherein part of the liquid crystal domains are controlled in orientation axis-symmetrically by the wall surface effect proper to said partitions.

5. The liquid crystal display apparatus according to claim 2 wherein each liquid crystal area is of a small size and a plurality of the liquid crystal areas are arrayed in a pixel of a large size in a lattice- or mesh-pattern.

* * * * *